(12) United States Patent
Liu

(10) Patent No.: US 11,393,422 B2
(45) Date of Patent: Jul. 19, 2022

(54) METHOD AND APPARATUS FOR CONTROLLING FRAME RATE OF DISPLAY SCREEN

(71) Applicant: BEIJING XIAOMI MOBILE SOFTWARE CO., LTD., Beijing (CN)

(72) Inventor: Hao Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/129,137

(22) Filed: Dec. 21, 2020

(65) Prior Publication Data

US 2021/0375224 A1    Dec. 2, 2021

(30) Foreign Application Priority Data

May 29, 2020   (CN) .......................... 202010477900.0

(51) Int. Cl.
*G09G 3/36* (2006.01)
*G06F 3/01* (2006.01)

(52) U.S. Cl.
CPC .......... *G09G 3/3666* (2013.01); *G06F 3/013* (2013.01); *G09G 2310/067* (2013.01); *G09G 2330/023* (2013.01); *G09G 2340/0435* (2013.01); *G09G 2354/00* (2013.01)

(58) Field of Classification Search
None
See application file for complete search history.

(56) References Cited

U.S. PATENT DOCUMENTS

| 2016/0133201 | A1* | 5/2016 | Border ................... G06F 1/163 345/694 |
| 2016/0366365 | A1 | 12/2016 | Iyer |
| 2018/0366068 | A1 | 12/2018 | Liu |
| 2019/0057647 | A1 | 2/2019 | Hack |
| 2019/0361658 | A1 | 11/2019 | Shi |
| 2021/0233494 | A1* | 7/2021 | Takazane ................. G09G 5/10 |

OTHER PUBLICATIONS

Extended European Search Report for EP application 20216668.2 dated May 6, 2021.

* cited by examiner

*Primary Examiner* — Yi Wang
(74) *Attorney, Agent, or Firm* — Syncoda LLC; Feng Ma

(57) ABSTRACT

A method for controlling a frame rate of a display screen includes: determining a first area and a second area of a display screen; and scanning the first area at a first frame rate, and scanning the second area at a second frame rate, wherein the first frame rate is greater than the second frame rate.

16 Claims, 8 Drawing Sheets

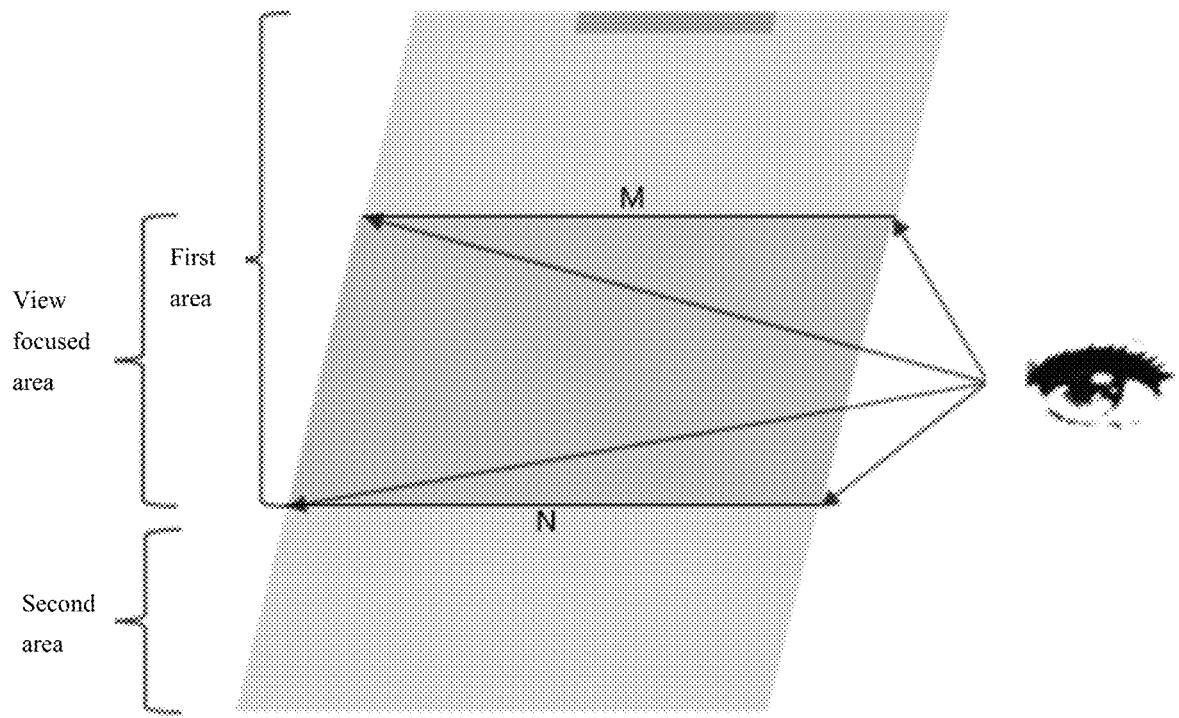

FIG. 4 obtaining a mapping relation table and an application corresponding to a display interface of the display screen, wherein the mapping relation table stores a correspondence between the application, the first area and the second area — S113 determining the first area and the second area based on the application corresponding to the display interface of the display screen and the mapping relation table — S114

FIG. 5

METHOD AND APPARATUS FOR CONTROLLING FRAME RATE OF DISPLAY SCREEN

CROSS-REFERENCE TO RELATED APPLICATIONS

This application claims priority to Chinese Patent Application No. 202010477900.0 filed on May 29, 2020, the disclosure of which is hereby incorporated by reference in its entirety

BACKGROUND

Currently, liquid crystal displays (LCDs) are widely used as display screens of electronic devices such as mobile phones and tablet computers. LCDs with higher frame rates ensure smoother and more realistic animations to meet users' perception needs

SUMMARY

The present disclosure relates to a field of electronics technologies, and more specifically to a method and an apparatus for controlling a frame rate of a display screen, and a storage medium.

In a first aspect, some embodiments of the present disclosure provide a method for controlling a frame rate of a display screen. The method includes: determining a first area and a second area of the display screen; scanning the first area at a first frame rate, and scanning the second area at a second frame rate, in which the first frame rate is greater than the second frame rate.

In a second aspect, some embodiments of the present disclosure provide an apparatus for controlling a frame rate of a display screen. The apparatus includes: a first determining unit and a scanning unit. The first determining unit is configured to determine a first area and a second area of the display screen. The scanning unit is configured to scan the first area at a first frame rate, and scan the second area at a second frame rate, in which the first frame rate is greater than the second frame rate.

In a third aspect, some embodiments of the present disclosure provide an apparatus for controlling a frame rate of a display screen. The apparatus includes: a processor and a memory storing instructions executable by the processor. The processor is configured to execute the method for controlling a frame rate of a display screen according to any embodiment of the first aspect.

In a fourth aspect, some embodiments of the present disclosure provide a non-transitory computer-readable storage medium, and when the instructions in the storage medium are executed by a processor of a terminal, the terminal is caused to execute the method for controlling a frame rate of a display screen according to any embodiment of the first aspect.

It should be understood that the above general description and the following detailed description are only exemplary and explanatory, and do not limit the present disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

FIG. 4 is a schematic diagram of an application scenario according to some embodiments.

FIG. 5 is a flowchart of a process of determining a first area and a second area of a display screen according to some embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

A picture displayed on the display screen is generally refreshed at a fixed high frame rate. However, the high frame rate inevitably increases power consumption of the display screen and affects endurance capacity of the terminal electronic product.

When users use terminals such as mobile phones and tablet computers, requirements for picture fluency and endurance capacity are high. However, a scanning and displaying mode at a high frame rate used to ensure picture fluency inevitably increases power consumption of the display screen and affects the endurance capacity of the terminal. In most cases, when the user watches the display screen of the terminal, a field of view does not cover the entire display screen. In this case, the power consumption generated by refreshing the picture at a high frame rate in an area on which the field of view is not focused is actually ineffective power consumption. Therefore, the scanning and displaying mode at a high frame rate is used for the view focused area of the display screen, and a scanning and displaying mode at a low frame rate is used for areas other than the view focused area, such that the power consumption of the display screen in the areas other than the view focused area can be reduced, and meeting the user's requirements on the picture fluency and endurance capacity of the terminal can be met.

Various embodiments of the present disclosure provide a method for controlling a frame rate of a display screen. By scanning the view focused area at a relatively high frame rate and scanning the areas other than the view focused area at a relatively low frame rate, the power loss of the areas other than the view focused area of the display screen is reduced, and the endurance capacity of the terminal is improved.

Figure 1:
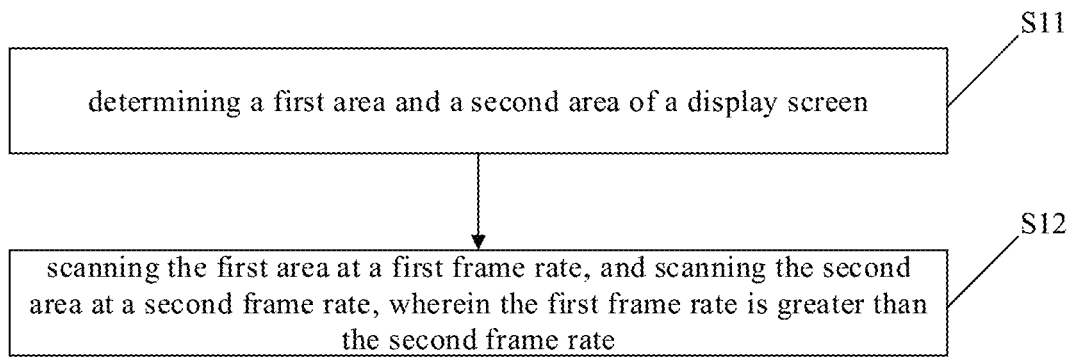
FIG. 1 is a flowchart of a method for controlling a frame rate of a display screen according to some embodiments.

FIG. 1 is a flowchart of a method for controlling a frame rate of a display screen according to some embodiments. As illustrated in FIG. 1, the method for controlling a frame rate of a display screen is applied in a terminal and includes the following steps.

At S11, a first area and a second area of a display screen are determined.

As the user watches the terminal's display screen, it is not necessary for all areas of the display screen to be displayed at a high frame rate. Therefore, it is possible to display different areas of the display screen at different frame rates according to the user' actual requirement on the frame rates of different areas of the display screen. In this embodiment, taking a case that a part of the display screen is displayed at a relatively high frame rate and another part of the display screen is displayed at a relatively low frame rate according to the user's requirement as an example, the part of the display screen is determined as the first area and another part of the display screen is determined as the second area. The first area and the second area can be determined in various ways.

Figure 2:
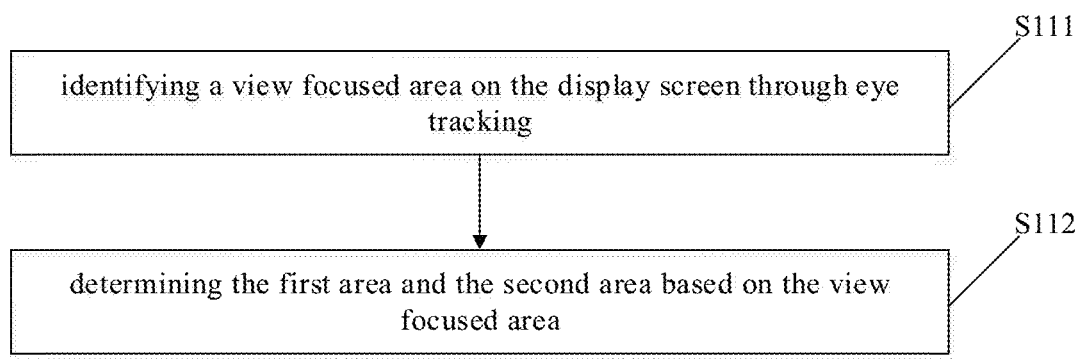
FIG. 2 is a flowchart of a process of determining a first area and a second area of a display screen according to some embodiments.

The first area is often an area that the user focuses on, which may be a display area currently watched by the user, an area where a dynamic picture is displayed on the display screen of the terminal, or a frequently watched area preset according to usage habits. In some embodiments of the present disclosure, the first area and the second area of the display screen can be determined by eye tracking. FIG. 2 is a flowchart of a process of determining the first area and the second area of the display screen according to some embodiments. As illustrated in FIG. 2, the process includes the following steps.

At S111, a view focused area is identified on the display screen through eye tracking.

In some embodiments, a camera on the terminal may be used to realize the eye tracking with support of software, to identify the view focused area when the user watches the display screen.

At S112, the first area and the second area are determined based on the view focused area.

In some embodiments, after applying the eye tracker to identify the view focused area on the display screen, an area including the view focused area may be determined as the first area, and areas other than the first area in the display screen may be determined as the second area.

Figure 3:
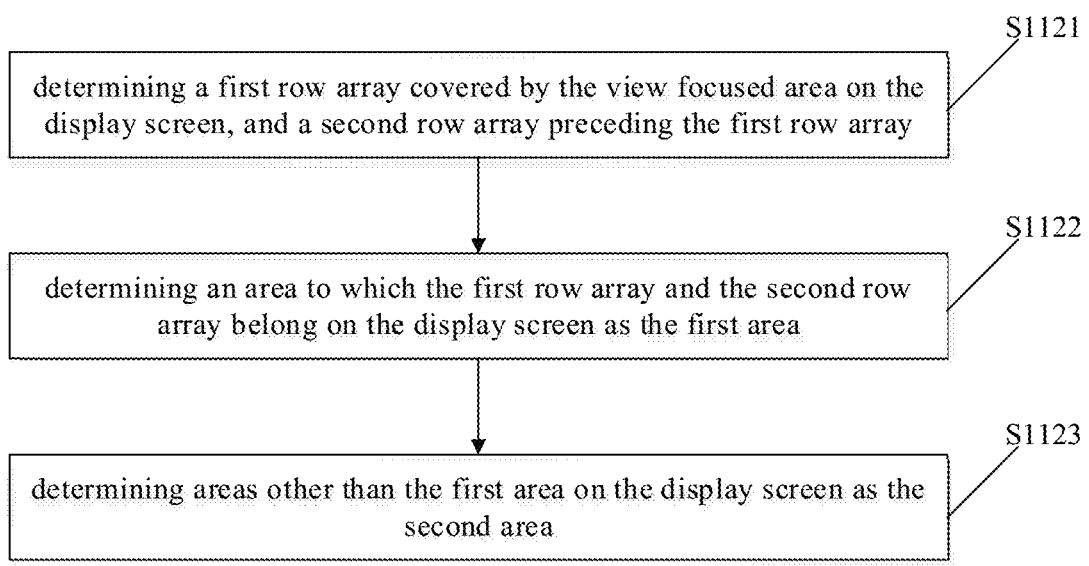
FIG. 3 is a flowchart of a process of determining a first area and a second area based on a view focused area according to some embodiments.

FIG. 3 is a flowchart of a process of determining the first area and the second area based on a view focused area according to some embodiments. FIG. 4 is a schematic diagram of an application scenario according to some embodiments. As illustrated in FIGS. 3 and 4, the process includes the following steps.

At S1121, a first-row array covered by the view focused area on the display screen and a second-row array preceding the first-row array is determined.

At S1122, an area to which the first-row array and the second-row array belong on the display screen is determined as the first area.

At S1123, areas other than the first area on the display screen are determined as the second area.

In this embodiment, taking an LCD screen as an example, the display screen includes a plurality of horizontal scanning lines and a plurality of vertical data lines. Intersections of the horizontal scanning lines and the vertical data lines define a plurality of pixel units, namely, the display screen includes a pixel unit array arranged to a plurality of rows of pixel units. When the view focused area on the display screen covers pixel units from the $M^{th}$ row to the $N^{th}$ row in the pixel unit array, the pixel units from the $M^{th}$ row to the $N^{th}$ row can be determined as the first-row array. The pixel units from the first row to the $M-1^{th}$ row in the pixel unit array covered by an area preceding the view focused area may be determined as the second-row array, which is located preceding the first-row array. A sum of the display area to which the first-row array belongs and the display area to which the second row array belongs is determined as the first area of the display screen, and areas other than the first area on the display screen are regarded as the second area.

It is understood that when there is no other area preceding the view focused area, that is, when the user watches the uppermost area of the display screen, the number of rows of pixel units included in the second row array is 0, and the display area to which the first row array belongs is the first area of the display screen.

The eye-tracking technology is used to identify the view focused area on the display screen, and a range of the first area and the second area can be adjusted in real time according to an actual situation of the area currently watched by the user, so that a determination of the range of the first area and the second area is more accurate and adaptable.

In another embodiment, the first area and the second area of the display screen are determined by a fixed setting method. FIG. 5 is a flowchart of a process of determining the first area and the second area of the display screen according to some embodiments. As illustrated in FIG. 5, the process includes the following steps.

At S113, a mapping relation table and an application corresponding to a display interface of the display screen are obtained, in which the mapping relation table stores a correspondence between the application, the first area and the second area.

At step S114, the first area and the second area are determined based on the application corresponding to the display interface of the display screen and the mapping relation table.

A variety of applications are often downloaded in the terminal, and a specific application often corresponds to a fixed display interface. For example, when a video playback application is opened, the upper half of the display interface displays dynamic pictures, and the lower half of the display interface displays text that can be swiped up and down by the user. Therefore, in this embodiment, a one-to-one correspondence may be established between the application in the terminal (for example, application ID), the first area and the second area, and stored in the mapping relation table, the mapping relation table may be stored in the terminal in advance. When the user runs an application, the terminal automatically calls the pre-stored mapping relation table to determine the first area and the second area of the display screen.

The first area and the second area of the display screen are determined by using a fixed setting method (i.e., establishing a one-to-one correspondence), which simplifies the determination of the first area and the second area and avoids unnecessary real-time monitoring in some cases, for example, when the user look away from the display screen temporarily, such that it is easy to implement.

Figure 6:
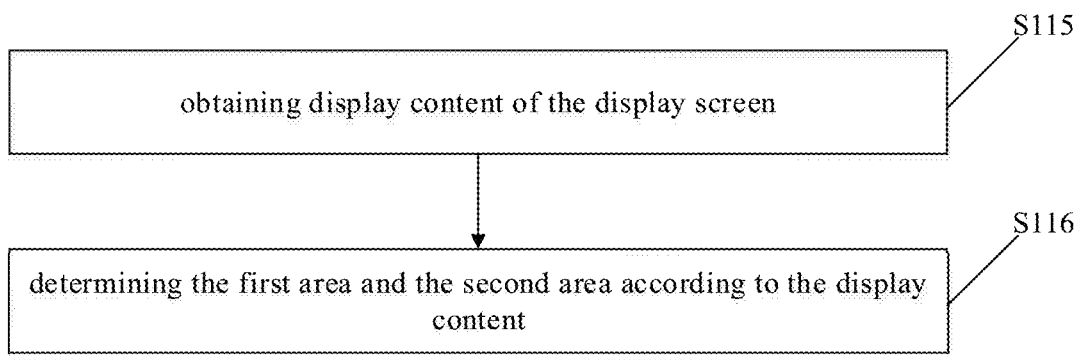
FIG. 6 is a flowchart of a process of determining a first area and a second area of a display screen according to some embodiments.

In another embodiment, the first area and the second area of the display screen are determined based on content of the picture currently displayed on the display screen. FIG. 6 is a flowchart of a process of determining the first area and the second area of the display screen according to some embodiments. As illustrated in FIG. 6, the process includes the following steps.

At S115, a display content of the display screen is obtained.

At S116, the first area and the second area are determined according to the display content.

When using the terminal, the display content of the display screen includes different kinds of content, such as text, static images and dynamic pictures, and the user may have different requirements on the frame rate of the display area for different display contents. For example, the area where the dynamic pictures are displayed is required to be displayed at a relatively high frame rate in order to obtain smooth and realistic pictures. The area where the static images are displayed is required to be displayed at a relatively low frame rate, as long as a good viewing experience could be achieved. Therefore, in this embodiment, the current display content of the display screen is acquired by means of automatic detection, automatic identification or the like, and the first area and the second area are determined based on different kinds of the display content.

In this method, not only the first area and the second area are determined according to the actual situation, but also unnecessary real-time monitoring is avoided, which is easy to implement.

However, the embodiments of the present disclosure are not limited to thereto, and the first area and the second area of the display screen can also be determined in other ways in other embodiments.

At S12, the first area is scanned at a first frame rate, and the second area is scanned at a second frame rate. The first frame rate is greater than the second frame rate.

The first area includes a display area where the user requires a higher frame rate, and the second area is a display area where the user requires a lower frame rate. Therefore, the first area is scanned at a relatively higher first frame rate, and the second area is scanned at a relatively lower second frame rate, which avoids the high power consumption of the display screen caused by refreshing the entire display screen at a fixed high frame rate, and improves the endurance capacity of the terminal.

In some embodiments of the present disclosure, the scanning sequence is controlled, to ensure that the first area is scanned at the first frame rate and the second area is scanned at the second frame rate.

Figure 7:
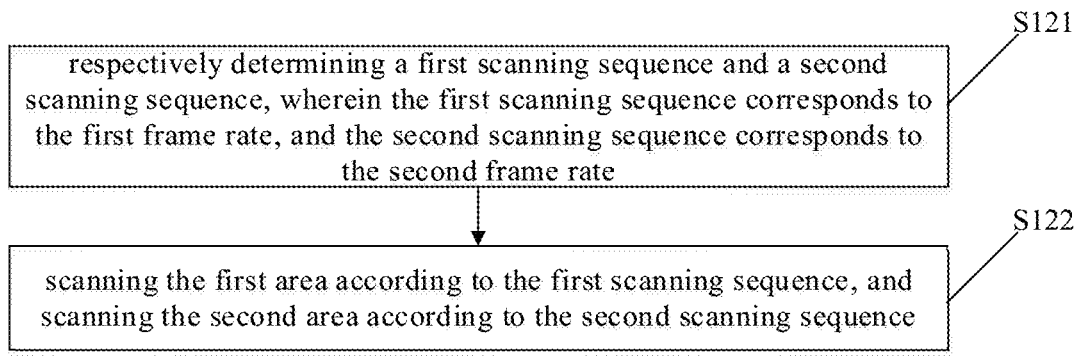
FIG. 7 is a flowchart of a process of scanning a first area at a first frame rate and scanning a second area at a second frame rate according to some embodiments.

FIG. 7 is a flowchart of a process of scanning the first area at the first frame rate and scanning the second area at the second frame rate according to some embodiments. As illustrated in FIG. 7, the process includes the following steps.

At S121, a first scanning sequence and a second scanning sequence are determined respectively, in which the first scanning sequence corresponds to the first frame rate, and the second scanning sequence corresponds to the second frame rate.

At S122, the first area is scanned according to the first scanning sequence, and the second area is scanned according to the second scanning sequence.

When the display screen displays a picture, the scanning is performed according to the scanning sequence, so that the frame rate of the display screen can be controlled by controlling the scanning sequence. In this embodiment, the first area is scanned based on the first scanning sequence corresponding to the first frame rate, and the second area is scanned based on the second scanning sequence corresponding to the second frame rate, so as to achieve the effect of reducing the power consumption caused by unnecessary scanning of the entire screen with a high frame rate.

Figure 8:
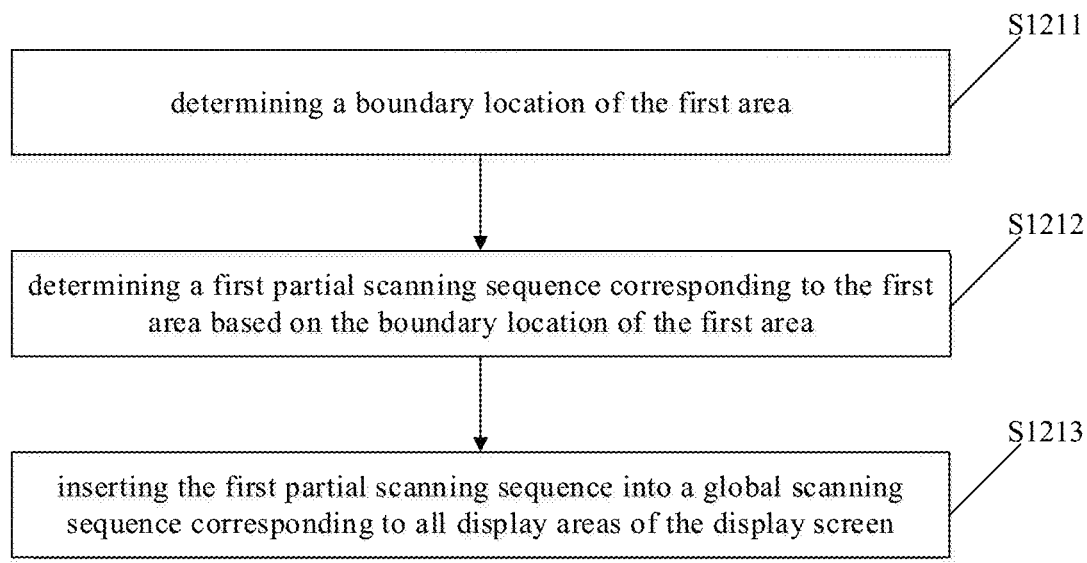
FIG. 8 is a flowchart of a process of determining a first scanning sequence according to some embodiments.

FIG. 8 is a flowchart of a process of determining the first scanning sequence according to some embodiments. As illustrated in FIG. 8, the process includes the following steps.

At S1211, a boundary location of the first area is determined.

Since the frame rates of the first area and the second area are different, the boundary location of the first area determines a dividing location of the display screen with different frame rates.

Figure 9:
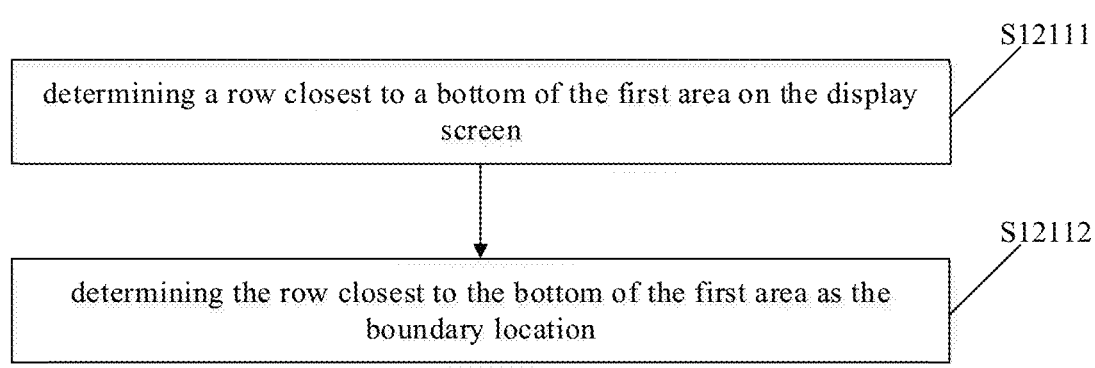
FIG. 9 is a flowchart of a process of determining a boundary location of a first area according to some embodiments.

FIG. 9 is a flowchart of a process of determining the boundary location of the first area according to some embodiments. As illustrated in FIG. 9, the process includes the following steps.

At S12111, a row closest to a bottom of the first area on the display screen is determined.

At S12112, the row closest to the bottom of the first area is determined as the boundary location.

In this embodiment, the first area of the display screen includes the pixel units from the $M^{th}$ row to the $N^{th}$ row in the pixel unit array, and the row closest to the bottom of the first area in the pixel units from the $M^{th}$ row to the $N^{th}$ row is determined as the boundary location, that is, the $N^{th}$ row is determined as the boundary location.

At S1212, a first partial scanning sequence corresponding to the first area is determined based on the boundary location of the first area.

In this embodiment of the present disclosure, the terminal display screen includes a display panel and a driving chip. The display panel, as described above, includes a plurality of horizontal scanning lines and a plurality of vertical data lines, and intersections of the horizontal scanning lines and the vertical data lines define a plurality of pixel units. Each pixel unit includes a thin film transistor (TFT), a gate of the TFT is connected to the horizontal scanning line, a drain of the TFT is connected to the vertical data line, and a source of the TFT is connected to a pixel electrode of the pixel unit. The driving chip includes a gate driving circuit and a source driving circuit. The gate driving circuit is electrically connected to the horizontal scanning line for providing scanning signals to the horizontal scanning line, and the source driving circuit is electrically connected to the data line for providing display signals to the data line.

When the display screen of the terminal displays a picture, the gate driving circuit provides the scanning signals to the plurality of horizontal scanning lines, so that the gates of the TFTs on the horizontal scanning lines are turned on row by row. Meanwhile, the pixel electrodes on the horizontal scanning lines are connected with the vertical data lines, so that voltages of the display signals on the data lines are written into the pixels row by row, such that the pixel units of the display panel are scanned row by row.

In the embodiments of the present disclosure, the first partial scanning sequence can be understood as that after the boundary location is determined, the pixel units in the first area above the boundary location are scanned row by row, and the pixel units in the second area below the boundary location are not scanned.

Figure 10:
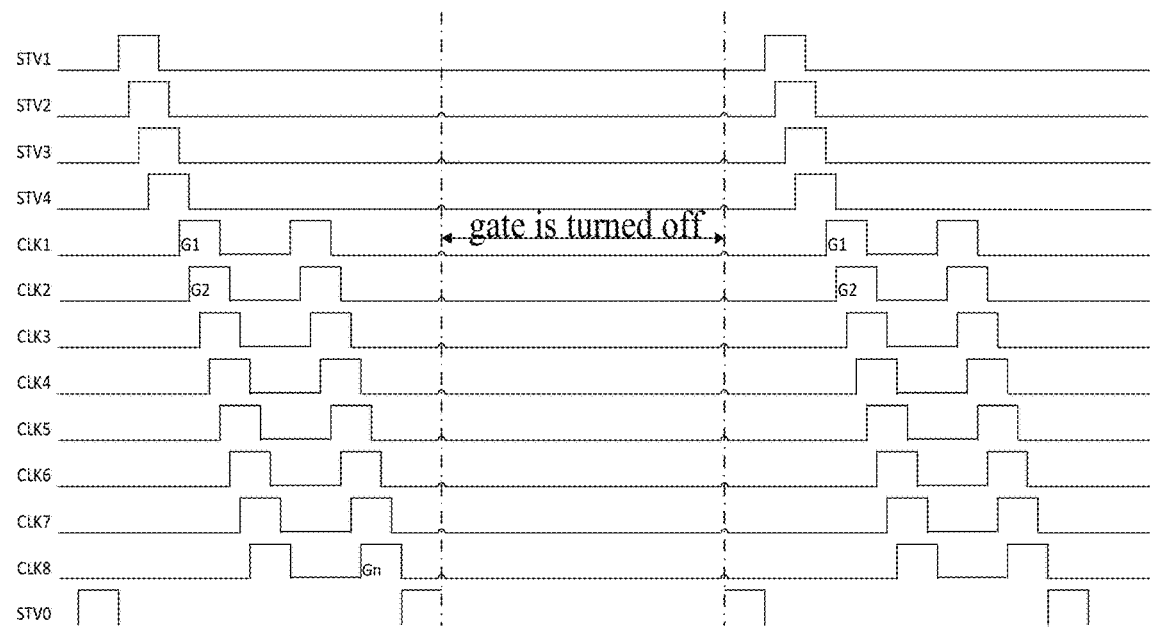
FIG. 10 is a schematic diagram of a first partial scanning sequence according to some embodiments.
Figure 11:
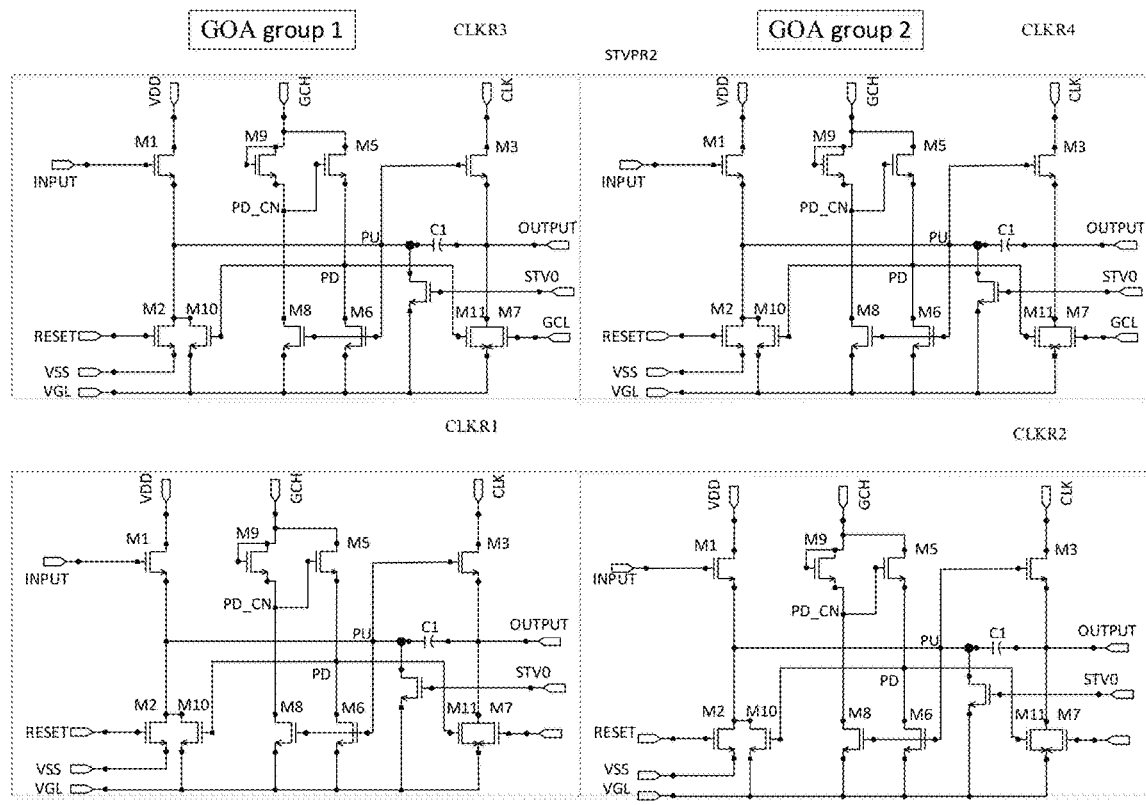
FIG. 11 is a schematic diagram of a partial scanning circuit according to some embodiments.

FIG. 10 is a schematic diagram of the first partial scanning sequence according to some embodiments. FIG. 11 is a schematic diagram of a partial scanning circuit according to some embodiments. As illustrated in FIGS. 10 and 11, the driving chip receives the boundary location and applies a low-level signal STV0 to the boundary location to drive the gates of the TFTs on the horizontal scanning lines in the first area above the boundary location to be turned on row by row, and the gates of the TFTs on the horizontal scanning lines in the second area below the boundary location to be turned off, so as to realize the scanning of the pixel units in the first area above the boundary location, without scanning the pixel units in the second area below the boundary location. In this way, the first partial scanning sequence corresponding to the first area can be determined based on the boundary location. The first partial scanning sequence and the partial scanning circuit can be slightly modified based on the existing scheme, which does not cause changes in yield or cost, such that it is conducive to scheme verification or mass production introduction.

At S1213, the first partial scanning sequence is inserted into a global scanning sequence corresponding to all display areas of the display screen.

The first area is the area that needs to be displayed at a high frame rate. The first partial scanning sequence corresponding to the first area is inserted into the global scanning sequence corresponding to all the display areas of the display screen, so that the first area is displayed at a relatively high frame rate, and the second area not corresponding to the inserted first partial scanning sequence is displayed at a relatively low frame rate.

In some other embodiments, in addition to the first area and the second area, the display screen may also include other areas, such as a third area. When the frame rate of the first area is greater than that of the second area, and the frame rate of the second area is greater than the frame rate of the third area, the first partial scanning sequence corresponding to the first area is inserted into the global scanning sequence corresponding to all the display areas of the display screen, and the second partial scanning sequence corresponding to the second area is inserted into the global scanning sequence corresponding to all the display areas of the display screen.

Figure 12:
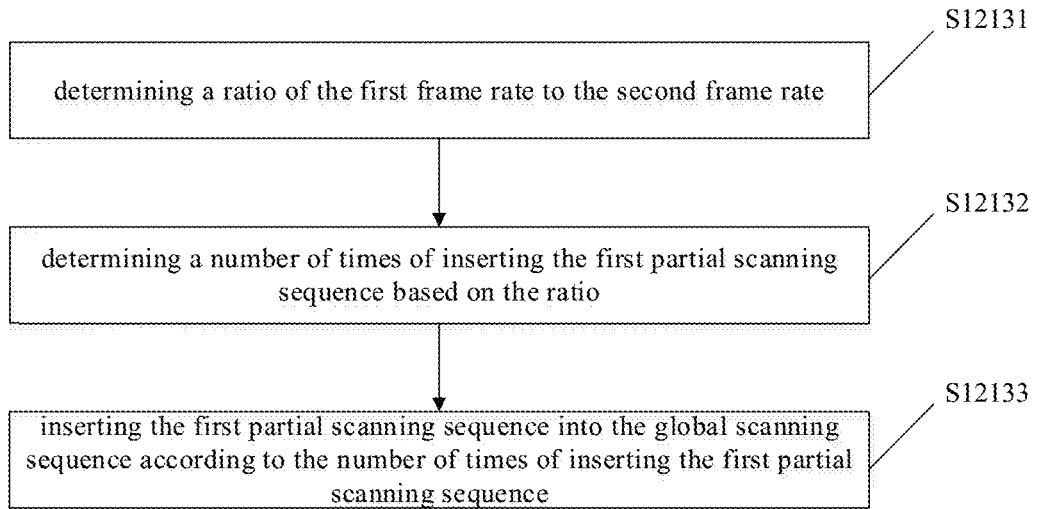
FIG. 12 is a flowchart of a process of inserting a first partial scanning sequence into a global scanning sequence corresponding to all display areas of a display screen according to some embodiments.

FIG. 12 is a flowchart of a process of inserting the first partial scanning sequence into the global scanning sequence corresponding to all the display areas of the display screen according to some embodiments. As illustrated in FIG. 12, the process includes the following steps.

At S12131, a ratio of the first frame rate to the second frame rate is determined.

The ratio of the first frame rate to the second frame rate depends on the first frame rate and the second frame rate. In some embodiments of the present disclosure, the first frame rate and the second frame rate are fixedly set by a terminal hardware.

In another embodiment of the present disclosure, the first frame rate and the second frame rate are manually set by the user.

In another embodiment of the present disclosure, the first frame rate and the second frame rate are set through the APP in the terminal with the help of software.

At S12132, the number of times of inserting the first partial scanning sequence is determined based on the ratio.

At S12133, the first partial scanning sequence is inserted into the global scanning sequence according to the number of times of inserting the first partial scanning sequence.

After the ratio of the first frame rate to the second frame rate is determined, the number of times of inserting the first partial scanning sequence into the global scanning sequence is determined according to the ratio. The higher the ratio, the greater the number of times of inserting the first partial scanning sequence after the global scanning sequence. In this way, the number of times of scanning the first area is large in a scanning cycle based on combined effect of the global scanning sequence and the corresponding first partial scanning sequence, so that the first frame rate of the first area is high. For example, when the ratio of the first frame rate to the second frame rate is 4, each time the global scanning sequence is executed, the first partial scanning sequence is executed three times. When the ratio of the first frame rate to the second frame rate is 3, then each time the global scanning sequence is executed, the first partial scanning sequence is executed twice.

In some embodiments of the present disclosure, if the first frame rate is set to 120 Hz, and the second frame rate is set to 30 Hz, then three frames are scanned according to the first partial scanning sequence after one frame is scanned according to the global scanning sequence.

In another embodiment of the present disclosure, if the first frame rate is set to 120 Hz, and the second frame rate is set to 40 Hz, then two frames are scanned according to the first partial scanning sequence after scanning one frame according to the global scanning sequence.

In another embodiment of the present disclosure, if the first frame rate is set to 90 Hz and the second frame rate is set to 30 Hz, then two frames are scanned according to the first partial scanning sequence after scanning one frame according to the global scanning sequence.

Based on the same concept, the embodiments of the present disclosure also provide an apparatus for controlling a frame rate of a display screen.

It is understood that, in order to realize the above-mentioned functions, the apparatus for controlling a frame rate of a display screen according to the embodiments of the present disclosure includes hardware structures and/or software modules corresponding to each function. In combination with the units and algorithm steps of the examples disclosed in the embodiments of the present disclosure, the embodiments of the present disclosure may be implemented in the form of hardware or a combination of hardware and computer software. Whether a function is executed by hardware or computer software-driven hardware depends on the specific application and design constraints of the technical solution. Those skilled in the art may use different methods for each specific application to implement the described functions, but such implementation should not be considered as going beyond the scope of the technical solution of the embodiments of the present disclosure.

Figure 13:
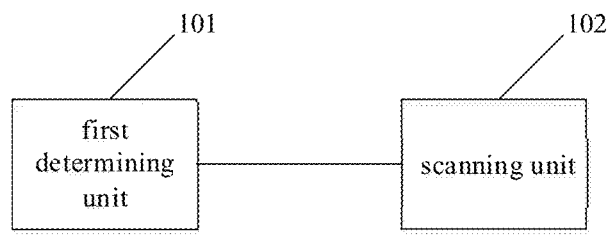
FIG. 13 is a first block diagram of an apparatus for controlling a frame rate of a display screen according to some embodiments.

FIG. 13 is a block diagram of an apparatus for controlling a frame rate of a display screen according to some embodiments. As illustrated in FIG. 13, the apparatus for controlling a frame rate of a display screen 100 includes: a first determining unit 101 and a scanning unit 102.

The first determining unit 101 is configured to determine a first area and a second area of a display screen. The scanning unit 102 is configured to scan the first area at a first frame rate, and scan the second area at a second frame rate, in which the first frame rate is greater than the second frame rate.

Figure 14:
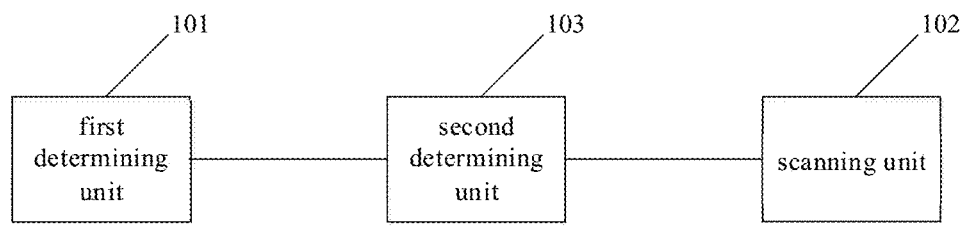
FIG. 14 is a second block diagram of an apparatus for controlling a frame rate of a display screen according to some embodiments.

FIG. 14 is a block diagram of an apparatus for controlling a frame rate of a display screen according to some embodiments. As illustrated in FIG. 14, the apparatus 100 for controlling a frame rate of a display screen further includes: a second determining unit 103. The second determining unit 103 is configured to determine a first scanning sequence and a second scanning sequence, respectively. The first scanning sequence corresponds to the first frame rate, and the second scanning sequence corresponds to the second frame rate.

In some embodiments, the scanning unit 102 is configured to scan the first area at the first frame rate and scan the second area at the second frame rate by: scanning the first area based on the first scanning sequence, and scanning the second area based on the second scanning sequence.

In some embodiments, the second determining unit 103 is configured to determine the first scanning sequence by: determining a boundary location of the first area; determining a first partial scanning sequence corresponding to the first area based on the boundary location of the first area; and inserting the first partial scanning sequence into a global scanning sequence corresponding to all display areas of the display screen.

In some embodiments, the second determining unit 103 is configured to insert the first partial scanning sequence into the global scanning sequence corresponding to all the display areas of the display screen by: determining a ratio of the first frame rate to the second frame rate; determining a number of times of inserting the first partial scanning sequence based on the ratio; and inserting the first partial scanning sequence into the global scanning sequence based on the number of times of inserting the first partial scanning sequence.

In some embodiments, the second determining unit 103 is configured to determine the boundary location of the first area by: determining a row closest to a bottom of the first area on the display screen; and determining the row closest to the bottom of the first area as the boundary location.

In some embodiments, the first determining unit 102 is configured to determine the first area and the second area of the display screen by: identifying a view focused area on the display screen through eye tracking; and determining the first area and the second area based on the view focused area.

In some embodiments, the first determining unit 102 is configured to determine the first area and the second area based on the view focused area by: determining a first row array covered by the view focused area on the display screen, and a second row array preceding the first row array; determining an area to which the first row array and the second row array belong on the display screen as the first area; and determining areas other than the first area on the display screen as the second area.

In some embodiments, the first determining unit 102 is configured to determine the first area and the second area of the display screen by: obtaining a mapping relation table and an application corresponding to a display interface of the display screen, in which the mapping relation table stores a correspondence between the application, the first area and the second area; and determining the first area and the second area based on the application corresponding to the display interface of the display screen and the mapping relation table.

In some embodiments, the first determining unit is configured to determine the first area and the second area of the display screen by: obtaining display content of the display screen; and determining the first area and the second area based on the display content.

Regarding the apparatus in the foregoing embodiments, the specific manner in which each unit performs operations has been described in detail in the method embodiments, and detailed description will not be given here.

Figure 15:
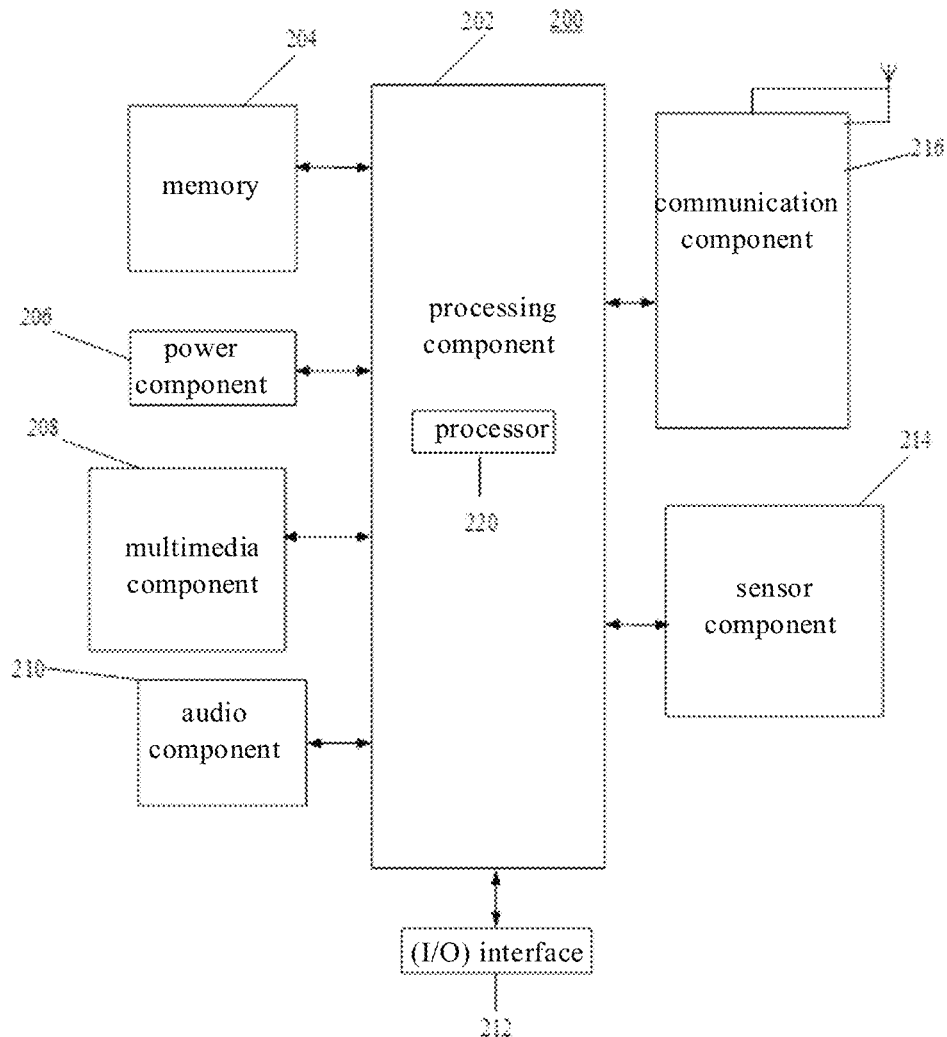
FIG. 15 is a third block diagram of an apparatus for controlling a frame rate of a display screen according to some embodiments.

FIG. 15 is a block diagram showing an apparatus 200 for controlling a frame rate of a display screen according to some embodiments. For example, the apparatus 200 may be a mobile phone, a computer, a digital broadcasting terminal, a message transceiver device, a game console, a tablet device, a medical device, a fitness device and a personal digital assistant.

As illustrated in FIG. 15, the apparatus 200 may include one or more of the following components: a processing component 202, a memory 204, a power component 206, a multimedia component 208, an audio component 210, an input/output (I/O) interface 212, a sensor component 214, and a communication component 216.

The processing component 202 typically controls overall operations of the apparatus 200, such as the operations associated with display, telephone calls, data communications, camera operations, and recording operations. The processing component 202 may include one or more processors 220 to execute instructions to perform all or part of the steps in the above described methods. Moreover, the processing component 202 may include one or more modules which facilitate the interaction between the processing component 202 and other components. For instance, the processing component 202 may include a multimedia module to facilitate the interaction between the multimedia component 208 and the processing component 202.

The memory 204 is configured to store various types of data to support the operation of the apparatus 200. Examples of such data include instructions for any applications or methods operated on the apparatus 200, contact data, phonebook data, messages, pictures, video, etc. The memory 204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 provides power to various components of the apparatus 200. The power component 206 may include a power management system, one or more power sources, and any other components associated with the generation, management, and distribution of power in the apparatus 200.

The multimedia component 208 includes a screen providing an output interface between the apparatus 200 and the user. In some embodiments, the screen may include a liquid crystal display (LCD) and a touch panel (TP). In some embodiments, an organic light-emitting diode (OLED) display or other types of displays can be employed.

If the screen includes the touch panel, the screen may be implemented as a touch screen to receive input signals from the user. The touch panel includes one or more touch sensors to sense touches, swipes, and gestures on the touch panel.

In some embodiments, the touch sensors not only can sense a boundary of a touch or swipe action, but also can sense a period of time and a pressure associated with the touch or swipe action. In some embodiments, the multimedia component 208 includes a front-facing camera and/or a rear-facing camera. When the apparatus 200 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 210 is configured to output and/or input audio signals. For example, the audio component 210 includes a microphone ("MIC") configured to receive an external audio signal when the apparatus 200 is in an operation mode, such as a call mode, a recording mode, and a voice recognition mode. The received audio signal may be further stored in the memory 204 or transmitted via the communication component 216. In some embodiments, the audio component 210 further includes a speaker to output audio signals.

The I/O interface 212 provides an interface between the processing component 202 and peripheral interface modules, such as a keyboard, a click wheel, buttons, and the like. The buttons may include, but are not limited to, a home button, a volume button, a starting button, and a locking button.

The sensor component 214 includes one or more sensors to provide status assessments of various aspects of the apparatus 200. For instance, the sensor component 214 may detect an open/closed status of the apparatus 200, relative positioning of components, e.g., the display and the keypad, of the apparatus 200, a change in position of the apparatus 200 or a component of the apparatus 200, a presence or absence of user contact with the apparatus 200, an orientation or an acceleration/deceleration of the apparatus 200, and a change in temperature of the apparatus 200.

The sensor component 214 may include a proximity sensor configured to detect the presence of nearby objects without any physical contact. The sensor component 214 may also include a light sensor, such as a CMOS or CCD image sensor, for use in imaging applications. In some embodiments, the sensor component 214 may also include an accelerometer sensor, a gyroscope sensor, a magnetic sensor, a pressure sensor, or a temperature sensor.

The communication component 216 is configured to facilitate communication, wired or wirelessly, between the apparatus 200 and other devices. The apparatus 200 can access a wireless network based on a communication standard, such as Wi-Fi, 2G, 3G, 4G, or 5G, or a combination thereof. In some embodiments, the communication component 216 receives a broadcast signal or broadcast associated information from an external broadcast management system via a broadcast channel.

In some embodiments, the communication component 216 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In some embodiments, the apparatus 200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer readable storage medium including instructions, such as included in the memory 204, executable by the processor 220 in the apparatus 200, for performing the above-described methods. For example, the non-transitory computer-readable storage medium may be a ROM, a RAM, a CD-ROM, a magnetic tape, a floppy disc, an optical data storage device, and the like.

The various device components, circuits, modules, units, blocks, or portions may have modular configurations, or are composed of discrete components, but nonetheless may be referred to as "modules" or "portions" in general. In other words, the "components," "circuits," "modules," "units," "blocks," or "portions" referred to herein may or may not be in modular forms, and these phrases may be interchangeably used.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light-emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A method for controlling a frame rate of a display screen, comprising:
  determining a first area and a second area of the display screen;
  scanning the first area at a first frame rate; and
  scanning the second area at a second frame rate;
  wherein the first frame rate is greater than the second frame rate;
  wherein the scanning the first area at the first frame rate and scanning the second area at the second frame rate comprises:
  determining a first scanning sequence and a second scanning sequence; wherein the first scanning sequence corresponds to the first frame rate, and the second scanning sequence corresponds to the second frame rate;
  scanning the first area based on the first scanning sequence; and
  scanning the second area based on the second scanning sequence;
  wherein the determining the first scanning sequence comprises:
  determining a boundary location of the first area;
  determining a first partial scanning sequence corresponding to the first area based on the boundary location of the first area, wherein the first partial scanning sequence indicates that pixel units in the first area are scanned row by row and pixel units in the second area are not scanned; and
  inserting the first partial scanning sequence into a global scanning sequence corresponding to all display areas of the display screen to obtain the first scanning sequence.

2. The method according to claim 1, wherein the inserting the first partial scanning sequence into the global scanning sequence corresponding to all the display areas of the display screen comprises:
  determining a ratio of the first frame rate to the second frame rate;
  determining a number of times of inserting the first partial scanning sequence based on the ratio; and
  inserting the first partial scanning sequence into the global scanning sequence based on the number of times of inserting the first partial scanning sequence.

3. The method according to claim 1, wherein the determining the boundary location of the first area comprises:
  determining a row closest to a bottom of the first area on the display screen; and
  determining the row closest to the bottom of the first area as the boundary location.

4. The method according to claim 1, wherein the determining the first area and the second area of the display screen comprises:
  identifying a view focused area on the display screen through eye tracking; and
  determining the first area and the second area based on the view focused area.

5. The method according to claim 4, wherein the determining the first area and the second area based on the view focused area comprises:
  determining a first-row array covered by the view focused area on the display screen, and a second-row array preceding the first-row array;
  determining an area to which the first-row array and the second-row array belong on the display screen as the first area; and
  determining areas other than the first area on the display screen as the second area.

6. The method according to claim 1, wherein the determining the first area and the second area of the display screen comprises:
  obtaining a mapping relation table and an application corresponding to a display interface of the display screen, wherein the mapping relation table stores a correspondence between the application, the first area and the second area; and
  determining the first area and the second area based on the application corresponding to the display interface of the display screen and the mapping relation table.

7. The method according to claim 1, wherein the determining the first area and the second area of the display screen comprises:
  obtaining display content of the display screen; and
  determining the first area and the second area based on the display content.

8. An apparatus for controlling frame rate of display screen, comprising:
  a processor;
  memory storing instructions executable by the processor; wherein
  the processor is configured to execute operations of controlling a frame rate of a display screen, comprising:
  determining a first area and a second area of the display screen;
  scanning the first area at a first frame rate; and
  scanning the second area at a second frame rate;
  wherein the first frame rate is greater than the second frame rate;
  wherein the scanning the first area at the first frame rate and scanning the second area at the second frame rate comprises:
  determining a first scanning sequence and a second scanning sequence; wherein the first scanning sequence corresponds to the first frame rate, and the second scanning sequence corresponds to the second frame rate;
  scanning the first area based on the first scanning sequence; and
  scanning the second area based on the second scanning sequence;
  wherein the determining the first scanning sequence comprises:
  determining a boundary location of the first area;
  determining a first partial scanning sequence corresponding to the first area based on the boundary location of the first area, wherein the first partial scanning sequence indicates that pixel units in the first area are scanned row by row and pixel units in the second area are not scanned; and
  inserting the first partial scanning sequence into a global scanning sequence corresponding to all display areas of the display screen to obtain the first scanning sequence.

9. The apparatus according to claim 8, wherein the inserting the first partial scanning sequence into the global scanning sequence corresponding to all the display areas of the display screen comprises:

determining a ratio of the first frame rate to the second frame rate;

determining a number of times of inserting the first partial scanning sequence based on the ratio; and inserting the first partial scanning sequence into the global scanning sequence based on the number of times of inserting the first partial scanning sequence.

10. The apparatus according to claim 8, wherein the determining the boundary location of the first area comprises:

determining a row closest to a bottom of the first area on the display screen; and determining the row closest to the bottom of the first area as the boundary location.

11. The apparatus according to claim 8, wherein the determining the first area and the second area of the display screen comprises:

identifying a view focused area on the display screen through eye tracking; and determining the first area and the second area based on the view focused area.

12. The apparatus according to claim 11, wherein the determining the first area and the second area based on the view focused area comprises:

determining a first-row array covered by the view focused area on the display screen, and a second-row array preceding the first-row array;

determining an area to which the first-row array and the second-row array belong on the display screen as the first area; and determining areas other than the first area on the display screen as the second area.

13. The apparatus according to claim 8, wherein the determining the first area and the second area of the display screen comprises:

obtaining a mapping relation table and an application corresponding to a display interface of the display screen, wherein the mapping relation table stores a correspondence between the application, the first area and the second area; and determining the first area and the second area based on the application corresponding to the display interface of the display screen and the mapping relation table.

14. The apparatus according to claim 8, wherein the determining the first area and the second area of the display screen comprises:

obtaining display content of the display screen; and determining the first area and the second area based on the display content.

15. An electronic device comprising the apparatus according to claim 8, and the display screen having a plurality of different areas, wherein the plurality of different areas are scanned at different frame rates to avoid a high power consumption of the display screen caused by refreshing the entire display screen at a fixed high frame rate, thereby improving endurance of the electronic device.

16. A non-transitory computer-readable storage medium, wherein when the instructions in the storage medium are executed by a processor of a terminal, the terminal is caused to execute operations of controlling a frame rate of a display screen, comprising:

determining a first area and a second area of the display screen;

scanning the first area at a first frame rate; and scanning the second area at a second frame rate;

wherein the first frame rate is greater than the second frame rate;

wherein the scanning the first area at the first frame rate and scanning the second area at the second frame rate comprises:

determining a first scanning sequence and a second scanning sequence; wherein the first scanning sequence corresponds to the first frame rate, and the second scanning sequence corresponds to the second frame rate;

scanning the first area based on the first scanning sequence; and scanning the second area based on the second scanning sequence;

wherein the determining the first scanning sequence comprises:

determining a boundary location of the first area;

determining a first partial scanning sequence corresponding to the first area based on the boundary location of the first area, wherein the first partial scanning sequence indicates that pixel units in the first area are scanned row by row and pixel units in the second area are not scanned; and inserting the first partial scanning sequence into a global scanning sequence corresponding to all display areas of the display screen to obtain the first scanning sequence.

* * * * *